United States Patent [19] [11] 3,906,398
Low et al. [45] Sept. 16, 1975

[54] INERT GAS METALLIC VAPOR LASER

[76] Inventors: George M. Low, Administrator of the National Aeronautics and Space Administration, with respect to an invention of Gary R. Russell, Sierra Madre; Noble M. Nerheim, Arcadia; Thomas J. Pivirotto, Sierra Madre, all of Calif.

[22] Filed: Dec. 3, 1973

[21] Appl. No.: 420,813

[52] U.S. Cl. ............ 331/94.5 G; 330/4.3; 310/11; 331/94.5 PE
[51] Int. Cl. ......................... H01s 3/22; H01s 3/06
[58] Field of Search ........ 331/94.5; 330/4.3; 310/11

[56] References Cited
UNITED STATES PATENTS
3,543,179   11/1970   Wilson .............................. 331/94.5
3,571,747   3/1971    Bronfin et al. .................... 331/94.5
3,654,567   4/1972    Hodgson .......................... 331/94.5

OTHER PUBLICATIONS
Ferrar, IEEE J. of Quantum Electronics, QE-9, No. 8, Aug. 1973, pp. 856–857.
McMahan, Optical Spectra, Vol. 5, No. 10, Dec. 1971, pp. 30–34.
Seguin et al., Applied Optics, Vol. 11, No. 4, Apr. 1972, pp. 745–748.

*Primary Examiner*—Robert J. Webster
*Attorney, Agent, or Firm*—Monte F. Mott; Paul McCaul; John Manning

[57] ABSTRACT

An inert gas-copper vapor laser consists of a multichamber structure, wherein inert gases are heated, mixed with copper powder which is then vaporized, thereby establishing an inert gas-copper vapor mixture, in a plenum chamber. The inert gas copper vapor mixture, hereinafter referred to as the lasant, passes from the plenum chamber through a nozzle into a laser chamber, wherein it flows a lasant stream of a desired velocity. positioned in the laser chamber are a pair of spaced apart mirrors and a pair of spaced apart electrodes which together form a cylindrical laser cavity through which the lasant flows. One or both electrodes are comb-shaped. Each comb-shaped electrode consists of a plurality of equal length wires, all of which are connected together at a common terminal. The ends of the wires, opposite the ends which are connected together at the common terminal, define tips which are equally spaced apart in a direction parallel to the cavity axis and are equally spaced therefrom. Current discharge due to a current pulse applied to the electrodes takes place at the wires' tips. Each electrode is protected by a boron nitride electrode protective member which is slotted so that only the tips of the wires are exposed to the opposite electrode and to the hot plasma flowing between the electrodes through the laser cavity.

10 Claims, 7 Drawing Figures

3,906,398

INERT GAS METALLIC VAPOR LASER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

1. Field of the Invention

The present invention relates to a gas laser and, more particularly, to a novel inert gas-metallic vapor laser. 2. Description of the Prior Art Various gas lasers employing inert gases are well known. Also, known are various lasers which employ lasant in the form of vaporized copper. Some of these are of the pulsed type in which in response to successive electrical current triggering pulses, pulses of laser energy are produced. Most of these lasers are of very low efficiency. Consequently, such lasers cannot be used in many applications in which relatively high efficiency and/or high energy per pulse are required. For example, such lasers cannot be used to propagate relatively large amounts of power through space.

OBJECTS AND SUMMARY OF THE INVENTION

It is a primary object of the present invention to provide a new gas type laser which exhibits relatively high efficiency and relatively high output energy per pulse in the visible spectrum.

Another object of the invention is to provide a new gas type laser in which the lasant is a mixture of inert gases and metallic vapor, and which is operable in a pulsed mode to provide high average power output.

These and other objects of the invention are achieved by providing a laser in which a lasant is formed consisting of a hot mixture of metallic vapor, e.g., copper vapor and an inert gas or gases, such as argon and/or helium. The laser includes a pair of novel spaced apart elongated electrodes, which are pulsed by current pulses from an appropriate pulsed power supply. The laser also includes a pair of mirrors which are spaced apart along an axis defined as the cavity axis about which the electrodes are aligned. The electrodes are spaced apart along an axis perpendicular to the cavity axis. The lasant is caused to flow in a direction perpendicular to the cavity axis and the current flow direction between the two electrodes.

The electrodes and the mirrors define a cylindrical laser cavity in the lasant path. The cavity length along the cavity axis is that represented by the length of the electrodes and its dimension in the orthogonal axis is equal to the diameter of either mirror in a plane perpendicular to the cavity axis.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
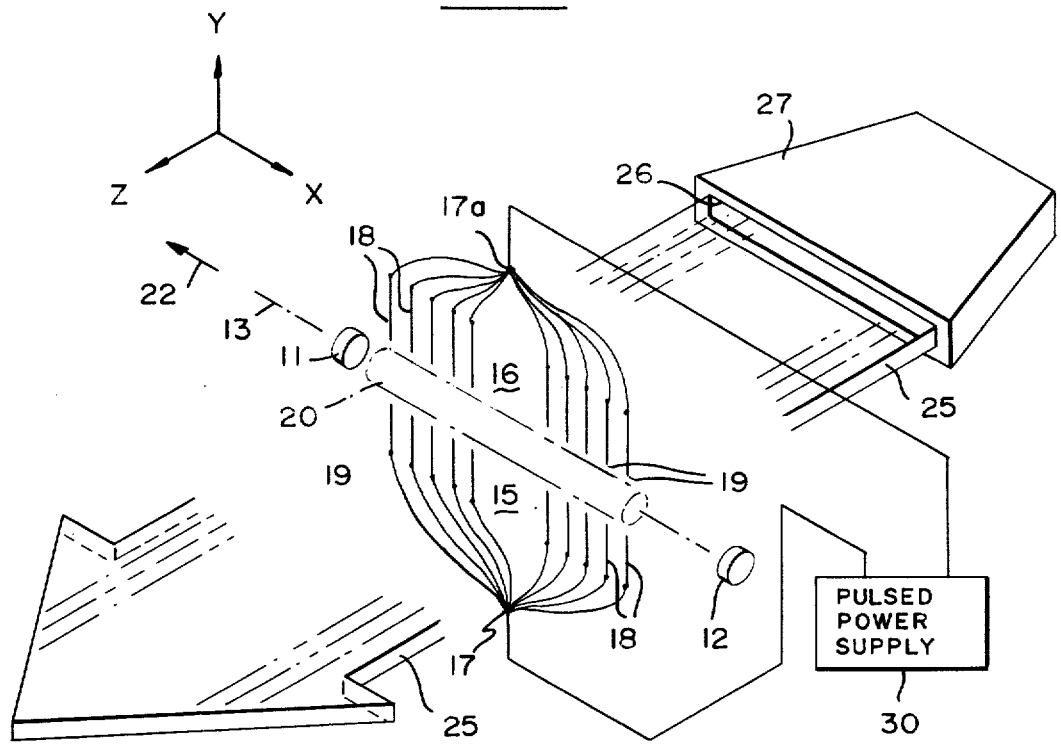
FIG. 1 is an isometric view of electrodes and mirrors defining a laser cavity and a lasant stream which are useful in explaining the invention.

Attention is first directed to FIG. 1 wherein the physical relationships of the laser's two mirrors, two electrodes and the lasant flow direction are diagrammed. The following description may be facilitated by considering axes X, Y and Z as three mutually perpendicular axes. The laser includes two mirrors 11 and 12, which are parallel to one another and are spaced apart along axis 13, hereinafter referred to as the cavity axis. Cavity axes 13 is parallel to the X axis with mirrors 11 and 12 being aligned in planes parallel to the YZ plane, formed by axes Y and Z. The laser also includes a pair of spaced apart electrodes 15 and 16.

At least one of the electrodes, such as electrode 15 consists of a plurality of wires 18, which extend from a common terminal 17 with their opposite ends or tips 19 pointing toward the cavity axis 13. The tips 19 of the wires are equally spaced from the cavity axes, with the wires being equally spaced from one another in the X direction parallel to the cavity axis. All the wires 18 from their tips 19 to the common terminal 17 are of equal length. The identical impedance of the equal length wires 18 is sufficient to cause even distribution of the pulsed discharge amongst the several wires.

The portions of the wires near tips 19 are parallel to one another and can be thought of as being in an imaginary XY plane which includes the cavity axis 13. Due to the parallel wire portions and the equal spacings of their tips from the cavity axis the electrode can be thought of as being comb-shaped. In FIG. 1, electrode 16 is also shown as being comb-shaped with its wires 18 extending from a common terminal 17a and its wires' tips 19 equally spaced from the cavity axis. The wires 18 of both electrodes are in the same imaginary XY plane. The electrodes may be formed from different electrically conductive metals, e.g., tungsten and copper.

The laser's cavity, designated in FIG. 1 by numeral 20, is defined by the physical relationships of the mirrors and electrodes. Conventionally, a laser cavity represents the space between the two mirrors, centered about the cavity axis. As used herein, the cavity 20 is only that portion of space which extends between the two mirrors limited by the electrodes' length. Herein, assuming mirrors 11 and 12 to be circular, the shape of cavity 20 is that of a cylinder centered about the cavity axis 13 and of length equal to the length of the electrodes. Defining the mirror area in the YZ plane as $A_M$ and the length of either electrode as $L_E$, the cavity volume is $V_c = A_M \cdot L_E$.

In FIG. 1, mirror 11 is assumed to be partially transmissive, with the laser output being designated by arrow 22. Numeral 22 designates a lasant which is made to flow from a nozzle exit or opening 26 of a nozzle 27 in the Z direction so as to pass through the cavity 20. In accordance with the present invention, the lasant consists primarily of a mixture of one or more inert gases and a metallic vapor. Such a lasant has been found to produce relatively high laser output energy hen the laser electrodes 15 and 16 are pulsed by a current pulse from a pulsed power supply, designated in FIG. 1 by numeral 30. Power supply 30 is shown connected to the two electrodes at common terminals 17 and 17a.

In one embodiment, actually reduced to practice, the lasant consists of a heated mixture of argon, helium and copper vapor. In the particular embodiment mirrors with different coatings were used to vary the cavity transmittance from 3.8 to 48% for individual or simultaneous lasing at 5106 and 5782 A wavelengths, hereinafter referred to as lines, both of which are in visible spectrum or region. Experiments indicate that the power at 5106A is much larger than at 5782A and that the sum of the power of the two lines is approximately equal to the power obtained when the two lines oscillate simultanesouly. The measured energy density of each output pulse was found to be quite high. It was also discovered that the output energy increases by increasing the copper vapor density in the lasant. To date, the maximum measured energy density was .5μJcm$^{-3}$ per pulse, with both lines oscillating simultaneously, with a lasant temperature of 572°K and a cavity pressure of several Torr. High average power can be attained by multiple pulsing the electrode and by replenishing the lasant in the laser cavity with fresh lasant for each pulse. This can be attained by causing lasant to flow through the cavity 20 at a sufficiently high velocity to insure proper lasant replenishment.

Figure 2:
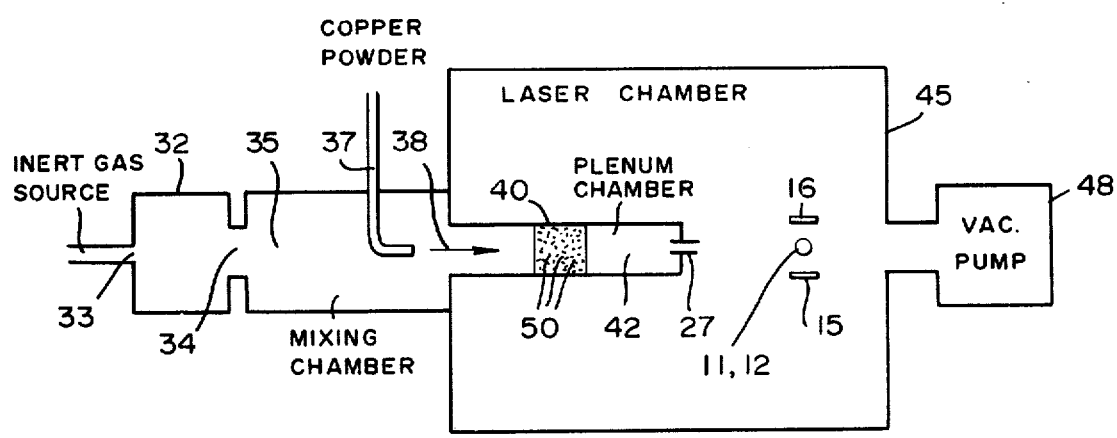
FIG. 2 is a diagram of one embodiment of the invention.

Attention is now directed to FIG. 2 which is useful in explaining one arrangement for producing the necessary lasant, consisting of inert gases and copper vapor. In FIG. 2, numeral 32 designates a heating chamber such as an arc heater, with an inlet 33 and an outlet 34. Inert gases such as argon or helium, or a mixture of both, are introduced into chamber 32 through its inlet 33 from an appropriate inert gas source. In chamber 32, the inert gases are heated up in order to provide energy for subsequent copper vaporization and to control the lasant temperature. The heated inert gases pass from chamber 32 through outlet 34 into a mixing chamber 35. Through an injection tube 37 copper powder is introduced into the mixing chamber. In one embodiment the copper powder injection was facilitated by an auxiliary flow of one of the inert gases, e.g., helium through the tube. The direction of matter flow in the chamber 35 is from left to right, as represented by arrow 38.

Some vaporization of the copper powder by the hot inert gases takes place in the chamber 35. However, to insure complete vaporization, the mixture is made to pass through a vaporizer chamber 40 which separates the mixing chamber 35 from a plenum chamber 42, from which nozzle 27 extends into a laser chamber or housing 45. The mirrors 11 and 12 and the electrodes 15 and 16 are located in chamber 45. The pressure in the laser chamber is controlled by a vacuum pump 48 which also draws the lasant 25, entering the chamber 45 through nozzle 27, out of the laser chamber. The pressure in chamber 45 is generally on the order of a few Torr.

The vaporizer chamber 40 is packed with material, such as tungsten chips 50. These chips are heated up by the mixture passing therethrough. The hot chips cause any copper powder remaining in the mixture to become fully vaporized. The chips are sufficiently densely packed to insure that all the remaining copper powder comes in contact with one or more of the hot tungsten chips and is vaporized by them. The tungsten chips may be replaced by chips of the other materials, which are characterized by low vapor pressure and high resistance to thermal shock, and which is easily wettable by the molten copper.

The lasant 25 accumulates in the plenum chamber due to continuous gas and copper flow into it. Thus, a pressure differential is created between the pressure in chamber 42 and that in the laser chamber 45. Due to this pressure differential, the lasant escapes into the chamber 45 through the nozzle 27. As shown in FIG. 1, the nozzle exit 26 is rectangular in shape. Thus, the lasant flows into laser chamber 45 in the form of a rectangularly-shaped slab of a hot mixture of inert gases and copper vapor. As is appreciated, as the lasant exits the nozzle opening 26, some lasant divergence takes place in chamber 45, particularly in the nozzle's exit short dimension (in the Y axis of FIG. 1). However, for explanatory purposes the lasant's cross-sectional dimension is shown to equal that of the nozzle exit 26. In practice, the mirrors and electrodes are placed down stream from the nozzle 27, so that the lasant shape in the XY plane as it flows through the cavity 20 is substantially the same as the cavity shape in the same plane.

As is appreciated, while the lasant's divergence is primarily a function of the pressure differential, the velocity of the lasant 25 in the laser chamber 45 is a function of the pressure differential and other parameters, such as the mixture temperature in the plenum chamber 42 and the copper density in the lasant. These parameters can be chosen to control the lasant velocity to be supersonic for multipulsing operation.

In one embodiment actually reduced to practice the dimensions of the nozzle exit 26 were 20 × 2 cm. The two electrodes 15 and 16 were positioned vertically and were separated by 5 cm. In the particular embodiment, the lower electrode, corresponding to electrode 15 in FIG. 1, consisted of a 1 mm thick, 20 cm long and a few mm wide copper strip, while only the top electrode 16 had the comb-like structure shown in FIG. 1. The electrodes are located 11.5 cm downstream from the nozzle 27. Electrode 16 consisted of wires 18 equally spaced along a 20 cm length parallel to the X axis. Each of wires 18 which was insulated with high temperature insulation except for its tip 19 was 50 cm long from the common terminal 17a to its tip 19. Each wire was an 18 gauge stranded copper wire. It was found that similar performance is obtainable with both electrodes having the comb-like structure.

The two mirrors 11 and 12 were 4 m radius multilayered dielectric (MLD)-coated mirrors spaced 75 cm apart along the axis 13. The aperture of each mirror was 2 cm. Thus, the cavity volume was taken as the cylinder defined by the 2 cm mirror aperture and the 20 cm discharge length, represented by the length of each electrode. The cavity volume was $\pi(2/2)^2 \cdot 20 = 20\pi \approx 63 cm^3$. This laser was pulsed by a current pulse from power supply 30 by a 0.1 μF capacitor charged to 10 Kv and discharged with a spark gap.

The plenum chamber pressure and temperature were measured near chamber 40 during each run. As previously indicated, the mirrors were varied to vary the cavity transmittance from 3.8 to 48% for individual and simultaneous lasing (oscillation) at 5106 and 5782A.

The plenum chamber pressure, nominally 30 Torr, increased when copper was added, but the temperature remained constant at about 1900°K. The copper vapor density in the laser cavity was determined from this observed pressure rise with the change in sound speed at the nozzle throat taken into account and under the assumption of no condensation of the copper vapor in the supersonic expansion.

Figure 3:
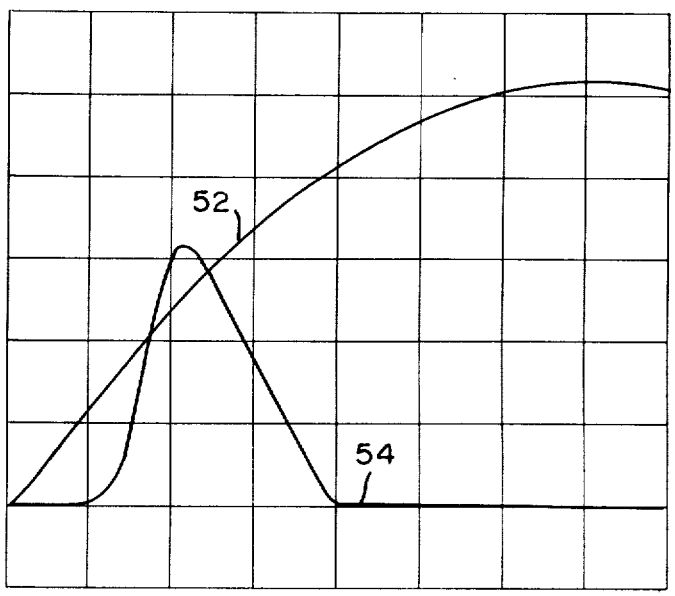

FIG. 3 to which reference is made shows a typical discharge current trace, designated by numeral 52, and the power output pulse at 5106A, designated by numeral 54, which were obtained with a mirror transmittance of 38%, a laser cavity pressure of 2 Torr with a copper injection rate of 0.27 g sec$^{-1}$. The copper density at this feed rate was $3.5 \times 10^{14}$ atoms per cubic cm. FIG. 3 indicates that the peak power occurred 220 nsec after initiation of the current and that the full width at half-maximum was 120 nsec. For the pulse shown, the peak power density was 1.5 Wcm$^{-3}$, and the measured energy density was 0.18 $\mu$Jcm$^{-3}$. For both wavelengths, the delay time varied from 220 to 250 nsec and the pulse width from 110 to 185 nsec.

Figure 4:
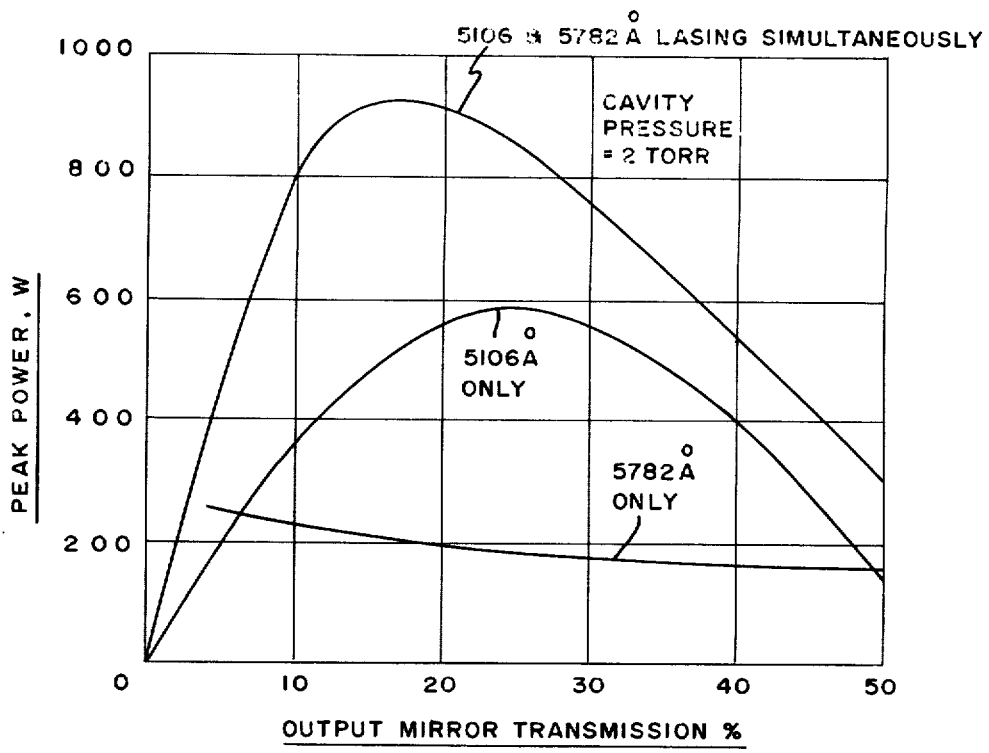
FIGS. 3 and 4 are useful in explaining the operation of one embodiment of the invention.

FIG. 4 is a diagram indicating the dependence of peak power on output mirror transmittance. The results diagrammed therein were obtained with a laser cavity pressure of 2Torr and a copper injection rate of 0.27 g sec$^{-1}$, for a copper density of $3.5 \times 10^{14}$ atoms cm$^{-3}$. As seen from this figure and as previously stated, the sum of the power of the two lines is approximately equal (within broad bands of tolerances) to the power obtained when both lines oscillated simultaneously.

At a cavity pressure of 8 Torr, the 5782-A oscillation was nearly extinguished while the peak power at 5106 A was increased by a factor of 2-3. This increase in peak power was accompanied by a decrease in pulse width so that the total energy remained almost constant. Doubling the copper powder injection rate at either 2 or 8 Torr about doubled the output energy. The maximum energy density measured to date was 2.5 $\mu$J cm$^{-3}$ with both lines oscillating simultaneously, where the temperature in the supersonic flow was 572°K. Calculations indicated that with an energy density of 2.5 $\mu$J cm$^{-3}$ the efficiency was about 1.5%.

Nearly all data was obtained with the inert gases in the lasant consisting of about 90% helium and 10% argon by volume. However, no significant difference in laser output was noted with the inert gases consisting of only one of the gases, e.g., pure argon, or with small amounts of nitrogen, hydrogen or water vapor added. The ratio of the copper atoms to the inert gas atoms in the lasant is of course variable. It depends on the copper injection rate through tube 37 and the inert gas flow rate. To date, runs were conducted yielding satisfactory results in which the ratio of the copper atoms to the inert gas atoms in the lasant was about 0.01. It should however be appreciated that this ratio can be increased (or decreased) by controlling the copper injection rate with respect to the inert gas flow rate.

Although, hereinbefore the invention has been described in connection with the use of copper to produce laser pulses at 5106 and 5782A, the invention is not limited thereto. It can be used with metals other than copper. For example, lead may replace copper to produce laser pulses at 7229A. Other metals may also be employed to produce high output energy and efficiency per pulse in the visible spectrum.

Figure 5:
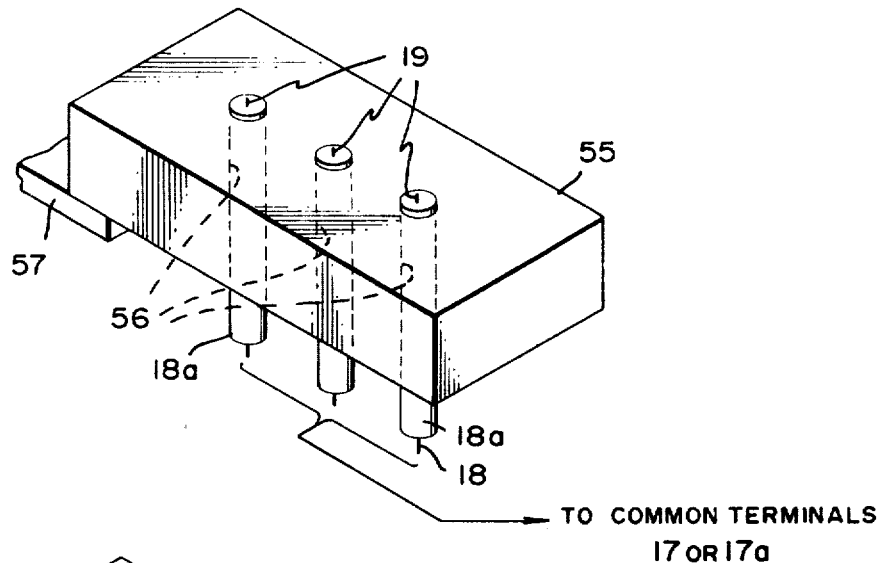
FIG. 5 is a partial isometric view of a comb-shaped electrode in accordance with the invention.

In constructing each comb-shaped electrode, some means are required to hold the various wires 18 in their spaced apart relationship along the X direction (parallel to the cavity axis) with all the tips 19 of the wires 18 equidistantly from the cavity axis. This was achieved in one embodiment by employing a wire holder designated in FIG. 5 by numeral 55. Spaced apart holes 56 were drilled in holder 55. These holes were used to accommodate the insulated wires therein with their tips 19 exposed toward the cavity axis 13. In FIG. 5, 18a designates the insulation of wires 18. The other ends of the wires 18 were electrically connected at the common terminal. The wire holder was secured in place by an electrode support member such as a metallic bracket 57.

In one embodiment, holder 55 consisted of a block of boron nitride. It was chosen due to the high resistance of boron nitride to thermal shock, and its reasonably good thermal conductivity properties. If desired, the potting matter exhibiting thermal stability properties may be used as holder 55. The potting material is preferably one which acts as an electrical insulator. Therein, wire portions from which the insulation was removed may be potted.

In practice, due to the lasant divergence in the laser chamber 45, the lasant flow in the XY plane through the cavity 20 is not limited to the space between the tips 19 of the wires of the two electrodes. Rather, the lasant's cross section in the XY plane is large enough in the Y axis to contact not only the tips 19 but also the holder 55 and the electrode support members 57. It was found that such contact causes copper deposition of some of the copper vapor in the lasant on the exposed wire tips 19 as well as on the surfaces of the holder 55 and the support members 57 which are directly exposed to and in the lasant path. As a result, the wires 18 become electrically connected to the holder 55 and the electrode support member 57. Such electrical connection causes some of the current discharge to occur through the support members 57 rather than between the wires tips 19 and through the lasant passing through the laser cavity. This is most undesirable. Also, the direct exposure of the wire tips to lasant is undesirable since the hot lasant greatly reduces electrode life.

These problems were overcome by protecting each electrode with a novel arrangement so that current discharging takes place only between the wires' tips and the tips are protected from the hot lasant. This arrangement may best be explained in conjunction with FIG. 6 and FIG. 7 which is a cross-sectional view along lines A—A in FIG. 6.

Figure 6:
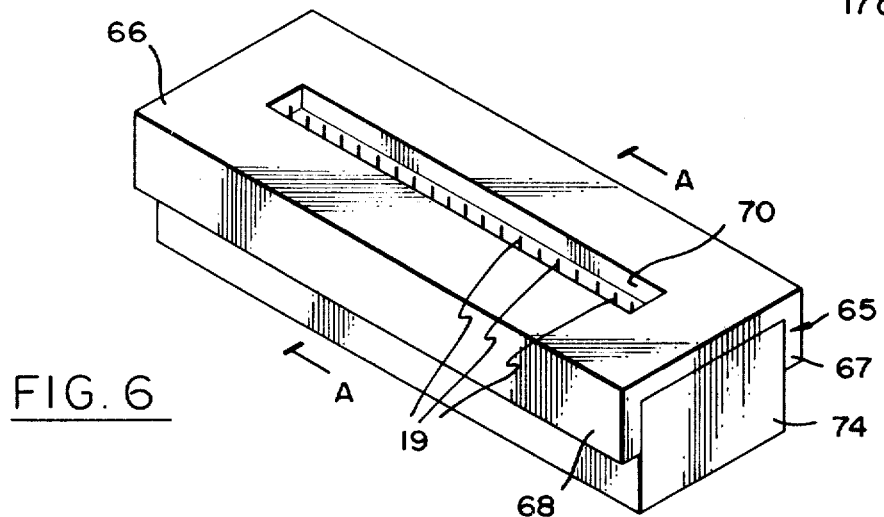
FIGS. 6 and 7 are diagrams useful in explaining the functions and shape of an electrode protector.
Figure 7:
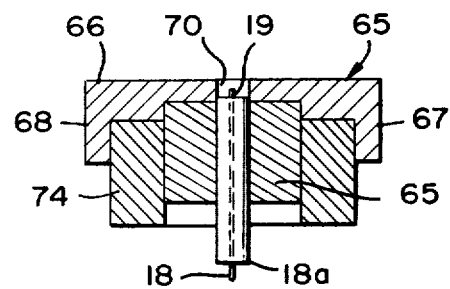

As shown in FIG. 6, the protective arrangement for each electrode, such as the lower electrode 15, consists of a U-shaped elongated channel 65 with a front side 66 and two opposite sides 67 and 68. A narrow slot, such as rectangular slot 70, is formed in the front side 66. The slot length is not less than the electrode length. The holder 55 with the wires 18 therein are supported within the holder 55 so that the tips 19 of the wires 18 are aligned with the slot 70. The holder 55 is positioned so that the tips 19 are recessed within the slot 70 below the surface of front side 66. Electrode cooling means are accommodated within channel 65 around holder 55 in order to provide electrode cooling. The entire electrode assembly comprising the holder 55, electrode protector 65 and the cooling means are physically conected together and held in place by the electrode support member 57.

Channel 65 which serves as an electrode protector is so fabricated of a material, e.g., boron nitride which exhibits thermal stability properties, i.e., high resistance to thermal shock. Preferably holder 55 and protector 65 should exhibit reasonably high thermal conductivity properties to facilitate the conduction of heat therefrom to the cooling means 74 and thereby facilitate electrode cooling.

In practice, a thin layer of copper of some of the copper vapor in the lasant is deposited on the lasant exposed surfaces of the protector 65 such as the surface of front side 66 and the exposed surfaces of the cooling means 74. However, no copper deposition takes place across slot 70. Consequently, tips 19 remain electrically insulated from the deposited copper layer. Therefore, current discharge occurs between the wire tips and through the lasant passing through the tips of opposite electrodes. In addition, by recessing the tips 19 within the protector 65, by several mm, the tips are protected from direct exposure in the hot lasant path. Thus, electrode life is increased significantly.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A laser comprising:
   first means adapted to receive at least one inert gas and metallic matter for producing a mixture definable as a gaseous lasant comprising of said inert gas and metallic vapor;
   a laser chamber;
   a pair of mirrors positioned in said laser chamber in two parallel mirror planes and spaced apart along an axis defining a cavity axis;
   first and second electrodes each including current discharge means spaced apart from one another and from said cavity axis in said laser chamber, the current discharge means of each of said electrodes being aligned in an imaginary plane including said cavity axis which is perpendicular to the mirror's planes with the current discharge means of said electrodes equidistantly spaced from said cavity axis on opposite sides thereof, and together with said mirrors defining a laser cavity, at least said first electrode being comb-shaped and comprising a plurality of electrically conductive wires, each having a first end electrically connected to a common terminal and a second end defining an exposed wire tip, and means for holding portions of said wires so the exposed wire tips are equidistantly spaced from one another in a direction parallel to said cavity axis, with all the tips equidistantly spaced from said cavity axis, the tips of said wires representing the current discharge means of said first electrode, said wires being of equal length between their first and second ends;
   nozzle means in communication with said first means and said laser chamber for providing a communication path for the lasant in said first means into said laser chamber in a direction, whereby some lasant enters said laser chamber and at least some of it passes through said laser cavity;
   vacuum means for controlling the pressure in said laser chamber and for withdrawing the lasant passing through said laser chamber;
   a first electrode cover member having a top side, facing said second electrode and defining a slot in said top side, with all the tips of the wires of said first electrode being exposed to said second electrode through said slot, said tips being recessed below the tip side of said member to protect the tips from direct exposure in the path of the lasant passing through said laser cavity, said first cover member being of a material which exhibits high resistance to thermal shock; and
   power means coupled to said common terminal of said first electrode and to said second electrode for applying a current pulse to said electrodes when lasant passes through the laser cavity.

2. The laser as described in claim 1 wherein the lasant flows through said cavity at a selected speed, with said power means providing a sequence of pulses at a selected frequency to said electrodes, whereby as each pulse is applied fresh lasant passes through said cavity.

3. The laser as described in claim 1 wherein said first cover member material is boron nitride.

4. The laser as described in claim 1 wherein each of the wires of said first electrode is a copper wire and the metallic vapor is copper vapor.

5. The laser as described in claim 1 wherein said second electrode is substantially identical to said first electrode, being comb-shaped with the tips of the wires of said second electrode representing the second electrode current discharge means, with the tips of the wires of both electrodes being in said imaginary plane and exposed to one another, said laser further including a second electrode cover member, substantially identical to said first electrode cover member, having a top side facing said first electrode and defining a slot through which the tips of the wires of said second electrode are exposed to the wire tips of said first electrode, the tips of the wires of said second electrode being recessed below the top side of said second electrode cover member to protect the tips of the wires of said second electrode from direct exposure to the lasant passing through said laser cavity.

6. The laser as described in claim 5 wherein said metallic vapor is copper vapor, the wires of at least one of the electrodes are copper wires and wherein at least one of said cover members is of boron nitride.

7. A laser comprising:
   a source of an inert gas;
   a heating chamber in communication with said source for receiving a flow of said inert gas at a selected rate from said source and for heating the inert gas to a selected temperature;
   a mixing chamber in communication with said heating chamber for receiving therefrom a flow of the inert gas heated therein, said mixing chamber including an inlet through which metallic powder is introduceable into said mixing chamber to be mixed therein with said heated inert gas;
   means including a plenum chamber and vaporizing means, which are in communication with said plenum chamber and said mixing chamber, with the mixture of the inert gas and metallic powder in said mixing chamber flowing through said vaporizing means, whereat said metallic powder is fully vaporized, with the inert gas and the metallic vapor, representing a lasant, exiting said vaporizing means into said plenum chamber, said vaporizing means comprises a bed of hot tungsten chips through which the mixture of the inert gas and the metallic powder passes, with the hot tungsten chips fully vaporizing said metallic powder, with the inert gas and the metallic vapor exiting said tungsten chips into said plenum chamber;

a laser chamber;

nozzle means extending from said plenum chamber to said laser chamber and defining a nozzle exit;

vacuum means for controlling the pressure in said laser chamber whereby the lasant in said plenum chamber flows into said laser chamber through said nozzle exit as a lasant stream, and is evacuated out of said chamber by said vacuum means;

a pair of laser mirrors spaced apart along an axis definable as a cavity axis;

first and second spaced apart electrically conductive electrodes, each including current discharge means disposed in an imaginary plane containing said cavity axis and perpendicular to the lasant stream direction, said mirrors and said current discharge means defining a laser cavity through which said lasant flows, said first electrode being comb-shaped and comprising a plurality of electrically conductive wires, each having a first end electrically connected to a common terminal and a second end defining a tip, the tips of all the wires representing the electrode's current discharge means, said electrode including means for holding said wires so that the wires' tips are equidistantly spaced from one another in a direction parallel to said cavity axis along a length equal to the laser cavity length, with all the tips being equidistantly spaced from said cavity axis, all the wires being of equal length between their first and second ends;

a first electrode cover member having a top side facing said second electrode and defining a slot in said top side, with all the tips of the wires of said first electrode being exposed to said second electrode through said slot, said tips being recessed below the top side of said cover member to protect the tips from direct exposure to the path of the lasant passing through said laser cavity, said first cover member being of a material which exhibits high resistance to thermal shock; and power means electrically connected to said electrodes for applying a current pulse, dischargeable at said current discharge means as said lasant flows therebetween in said laser cavity.

8. The laser as described in claim 7 wherein said cover member is of boron nitride.

9. The laser as described in claim 7 wherein said metallic powder is copper powder.

10. The laser as described in claim 9 wherein the wires of said first electrode are copper wires.

* * * * *